Jan. 20, 1942.   F. C. BEST   2,270,402
MOTOR VEHICLE SIGNAL SYSTEM
Filed April 21, 1939   2 Sheets-Sheet 1
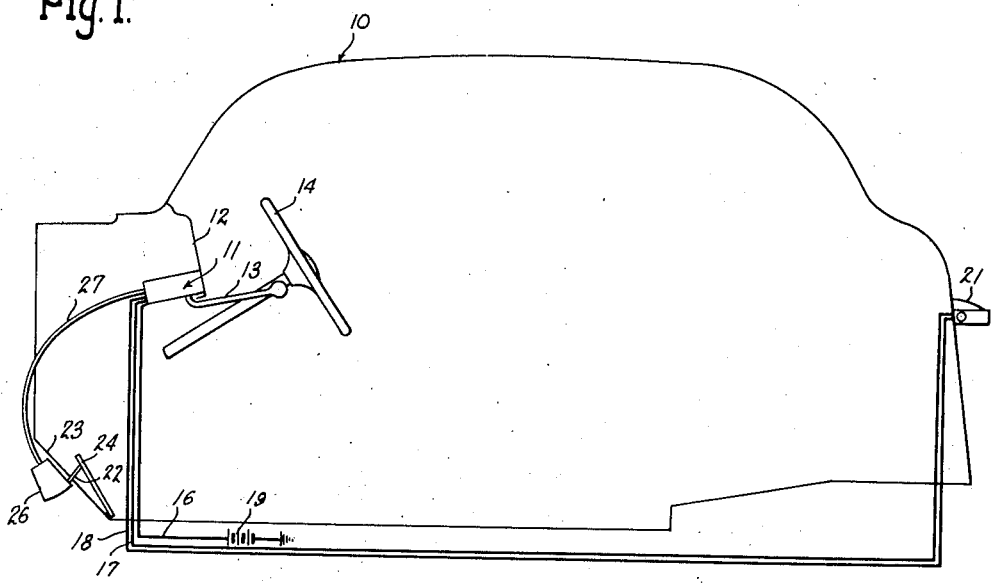
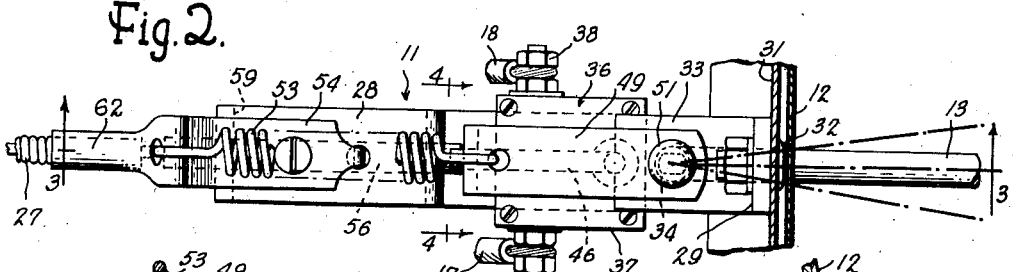
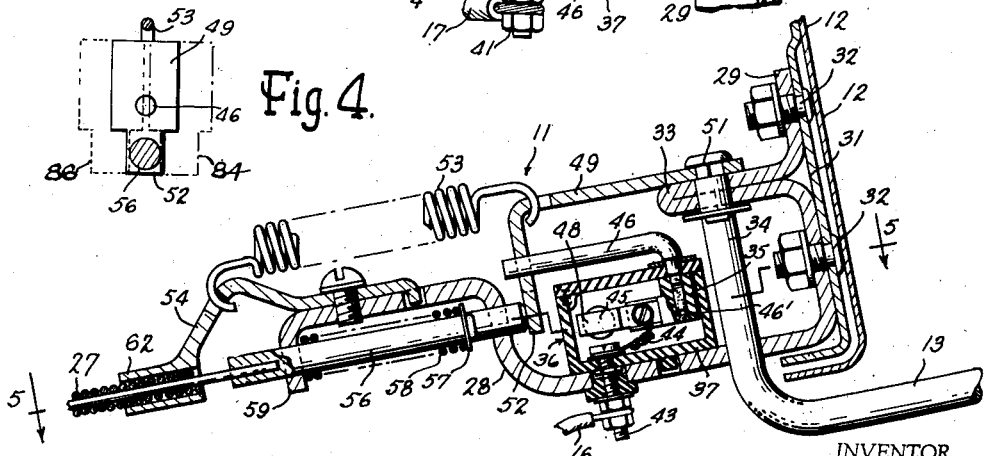
INVENTOR.
Frank C. Best
BY
Tibbetts & Hart
ATTORNEYS Jan. 20, 1942.　　　　F. C. BEST　　　　2,270,402
MOTOR VEHICLE SIGNAL SYSTEM
Filed April 21, 1939　　　2 Sheets-Sheet 2
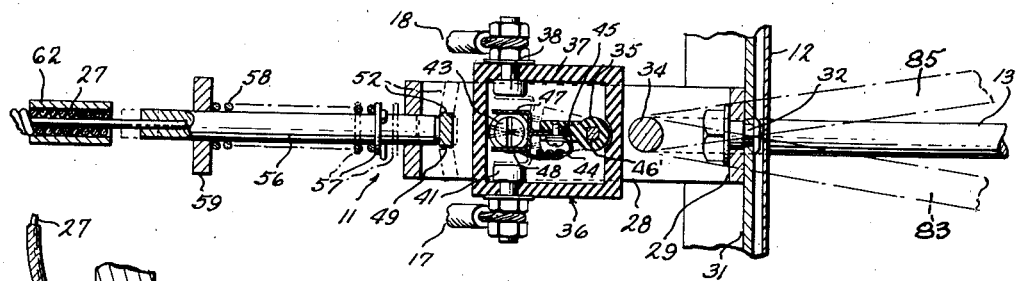
Fig. 5.
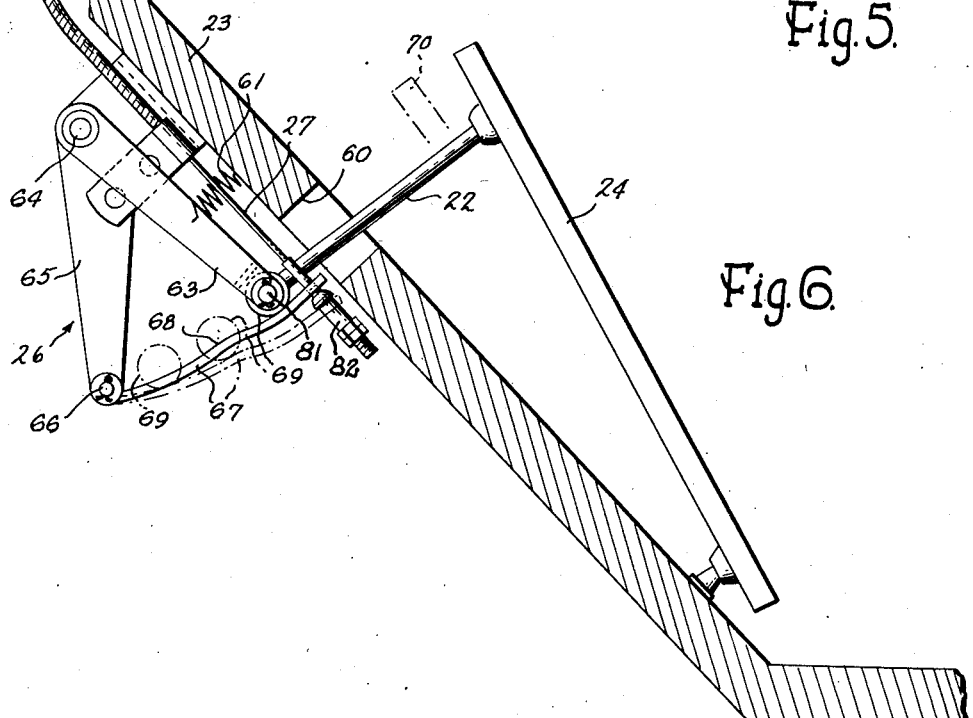
Fig. 6.
Fig. 7.
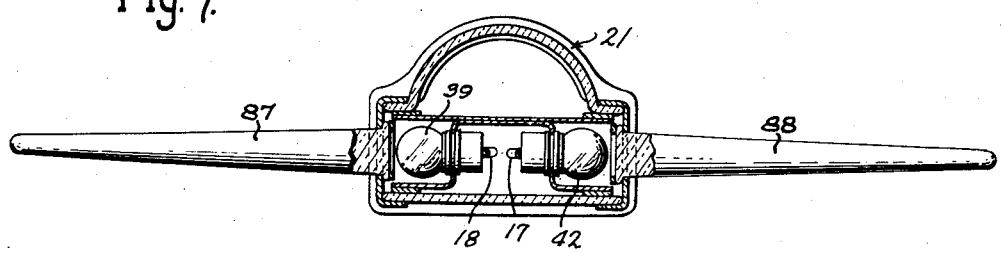
INVENTOR.
Frank C. Best
BY
Tibbetts & Hart
ATTORNEYS Patented Jan. 20, 1942

2,270,402

UNITED STATES PATENT OFFICE 2,270,402

MOTOR VEHICLE SIGNAL SYSTEM

Frank C. Best, Detroit, Mich., assignor to Packard Motor Car Company, Detroit, Mich., a corporation of Michigan Application April 21, 1939, Serial No. 269,203

8 Claims. (Cl. 200—59)

This invention relates to a signalling system and particularly to luminous direction indicators for motor vehicles.

The invention has for its primary object the provision in a motor vehicle of a direction signal system in which the indicator after being placed in signalling position may remain so under certain operating conditions until the indicated change of vehicular movement has been completely executed.

A more specific object of the invention resides in the provision of mechanism for manually controlling motor vehicle signal lights to indicate a change in direction or speed of the vehicle, together with means automatically locking the mechanism in signalling position upon a reduction of speed incident to the execution of the indicated change and automatically clearing the signal lights simultaneously with the resumption of normal vehicular speed after the indicated movement has been executed.

Another object of the invention contemplates the provision of an improved unit incorporating indicating signal lights and rear driving lights.

Other objects and advantages of the invention will become apparent from a reading of the following description taken in connection with the accompanying drawings.

Signalling systems have heretofore been suggested but they have all had undesirable characteristics. Some of these systems comprise a pedal actuated engine accelerator control and pedal actuated signal controls which may be retained in signalling position during a certain range of movement of the accelerator pedal. Other systems have depended upon the differential pressures in the engine manifold to actuate mechanism for retaining or releasing a manual signal control.

Systems of the first mentioned type do not meet the requirements of modern traffic driving because the pedal actuated signal control must be operated by a separate movement of the driver's foot after the foot has been raised to decelerate the vehicle. This extra foot movement delays the operator's application of the vehicle brakes and constitutes a dangerous and undesirable condition. In some prior systems of this type the signal controls have been incorporated in the accelerator pedal so that the operator would be constantly applying the signals unintentionally unless great care were exercised in the placement of his foot upon the pedal.

In systems of the vacuum type an expensive motor is required and necessary valves and other mechanism must be precisely adjusted or the signal will not clear at the proper time. Such precise adjustment is impractical for present day motor vehicle application.

According to the present invention the signal selector mechanism may be manually operated to obtain a desired indication and when the engine accelerator pedal control is within a predetermined range of movement near its retracted position, the signal selector mechanism is automatically retained in such indicating position by control mechanism until such time as the pedal is moved to cause acceleration of the engine, whereupon the signal selector automatically returns to a neutral position. Under normal, constant speed conditions of driving complete manual selection of the indicator system is retained.

In the drawings,

Fig. 1 diagrammatically illustrates the application of the present system to a motor vehicle;

Fig. 2 is a top plan view of the manual signal selector mechanism and its control mechanism;

Fig. 3 is a longitudinal sectional view of the selector and control mechanisms taken substantially on the line 3—3 of Fig. 2;

Fig. 4 is a sectional view taken substantially on the line 4—4 of Fig. 2;

Fig. 5 is a longitudinal sectional view of the signal selector and control mechanisms taken substantially on the line 5—5 of Fig. 3;

Fig. 6 is an elevational view of the engine accelerator pedal and part of the control mechanism for the selector mechanism;

Fig. 7 is a sectional view of the light unit.

Referring to Fig. 1 of the drawings, the signalling system incorporating the invention is diagrammatically shown installed in a motor vehicle 10. The system comprises generally a selective electric system having a light unit 21 at the rear of the vehicle, a switch mechanism 36, a manually operable selector mechanism 11 for the switch mechanism, and control mechanism 26 for the selector mechanism.

A feed conduit 16 leads from the vehicle battery 19 to the switch mechanism and conductor lines 17 and 18 lead from the switch mechanism to a pair of indicator bulbs in the light unit. The switch mechanism, the selector mechanism and a portion of the selector control mechanism are mounted on a carrier fixed to the vehicle instrument panel 12. This carrier comprises a stamping 28 having a flange 29 secured to the panel as at 32 and formed with a horizontal flange 33. This flange 33 and the main portion of the stamping have aligned openings to receive one end 34 of a hand lever 13 that has its other end extending to the rear of the panel and below the vehicle steering wheel 14.

A conventional accelerator pedal 24 is pivotally mounted on the vehicle toe board 23 and has a rod 22 pivotally connected thereto. The rod extends through a suitable opening 60 in the toe board and the lower end thereof is pivotally connected at 81 to an arm 63 fixed on a shaft 64 that is rotatably mounted and connected to operate mechanism connected to the throttle valve of the vehicle engine (not shown). The control mechanism 26 for the selector mechanism is associated to be actuated in conjunction with the arm 63 of the throttle valve actuating mechanism.

The switch mechanism 36 is of the multiple type. The switch mechanism comprises an insulation casing 37, suitably mounted on the stamping 28, having an electrical terminal 38 which may be suitably connected to one indicator bulb 39 through the conductor 18, and another terminal 41 connected to another indicator bulb 42 by the conductor 17. The casing also carries a terminal 43 that is connected to the vehicle battery 19 by the conductor 16. A connector 44 leads from the battery terminal 43 to a bifurcated contact element 45 having fingers 47 and 48. The connector and the element 45 are suitably carried by an oscillatable insulation member 35.

The movable switch structure is selectively moved to contact either terminal 38 or 41 by means of manually operable mechanism comprising lever 13, an angular lever 49 and an angular arm 46. The arm 46 is suitably fixed to the contact carrier 35 and projects into the path of movement of a finger 52 of arm 49, the latter arm being suitably fixed to an end 34 of lever 13 as at 51. Through operation of such mechanism the contacts 47 and 48 can thus be swung to selectively engage the adjacent terminals 38 and 41 respectively and thereby selectively cause the lighting of bulbs 39 or 42. The movable switch structure is normally moved to neutral position, that is so that the contacts 47 and 48 are disengaged, through means of a coil spring 53 secured at one end to lever 49 and at the other end to a bracket 54 that is suitably fixed to the stamping 28.

To obviate the necessity for the vehicle driver to manually maintain the system in indicating position during the execution of a change in vehicle direction and to provide for the automatic clearing of the signal after the change in direction has been executed, mechanism is provided that retains the switch mechanism in signal indicating position during a predetermined range of movement of the accelerator pedal 24 near its retracted position. This control mechanism includes a lock pin or bolt 56 that is slidable in openings in the stamping 28 and the stamping flange 59. A compression spring 58 is located between a shoulder 57 on the lock pin and flange 59 to urge the lock pin 56 beyond the end 52 of the switch actuating lever 49. Thus when the lever end 52 is manually moved to one side or the other of the pin 56, the pin will be urged by its spring 58 to the dotted line position of Fig. 5, preventing the return of the finger 52 to neutral position unless the lock pin is restrained from such movement.

The lock pin 56 and spring 58 form part of the switch control mechanism which will now be described. A Bowden wire 27 is fixed to an end of the pin in a relation to retract the same against the pressure of spring 58 and such wire extends through a guide sleeve 62 formed as a part of bracket 54 and in alignment with the pin openings in stamping 28 and its flange 59. This wire extends through the vehicle dash and beneath the toe board. Bracket 65 depends from and is suitably secured to toe board 23 and pivotally secured to this bracket by pin 66 is a lever 67 having a cam surface 68 extending toward the toe board. The free end of this cam lever may be provided with an opening to slidably receive an end of the Bowden wire 27 and the projecting end of the wire has secured thereto a retainer 82 engaging the cam lever. The free end of the throttle mechanism lever 63 is provided with a roller 69 adapted to engage and follow the cam surface of lever 67 in its movement toward and away from the toe board.

When the lever 13 is in its central position then the spring 53 holds the selector mechanism in position to retain the movable switch structure out of contact with the circuits leading to the bulbs. When the lever 13 is moved to the left it will lie in the position indicated by dot-and-dash lines 83 in Fig. 5 and the selector lever 49 will be swung to the right into the position as shown by dotted lines 84 in Fig. 4, thereby rocking lever 46 to engage the movable switch contact 47 against terminal 38 to energize the circuit for bulb 39. The rays from the light in this bulb are transmitted into the left glass indicator rod 87 that points to the left as viewed from behind the vehicle. When the lever 13 is moved to the right, it will lie in the position shown by dot-and-dash lines 85 in Fig. 5, and the selector lever 49 will be in its left position, as shown by dotted lines 86 in Fig. 4, thereby moving lever 46 to engage the movable switch contact 48 against terminal 41 to energize the circuit to bulb 42. The rays from this bulb are transmitted into the right glass indicator rod 88 as viewed from behind the vehicle.

When the lock pin 56 is retracted the selector mechanism can be freely shifted and maintained in either circuit forming position by manual operation. The control mechanism is arranged to lock the selector mechanism in circuit forming position under certain vehicle operating conditions and to release the selector mechanism from locked relation when desired. It is proposed to so arrange the control mechanism that the lights can be maintained automatically when the vehicle is decelerating to make a turn and thus the driver is not required to hold the manual actuator and can use both hands for the steering operation. For this purpose the throttle valve operating mechanism is utilized to cam the control mechanism and thereby cause the lock pin to function in accordance with movement of the accelerator pedal. The cam lever 67 is pivoted and formed with a roller engaging surface so that the roller 69 bearing thereagainst will cam the same and actuate the Bowden wire 27 in a direction retracting the lock pin 56 in only one portion of the travel of lever 63. Preferably the rear cam surface of the lever 67 is of arcuate form having its center substantially on the axis of rotation of lever 63 so that movement of the roller 69 thereacross will not move the Bowden wire downwardly to retract the lock pin, and under such circumstance the spring 58 will project the lock pin into position holding the lever 49 in position maintaining the movable switch element in the circuit forming contact to which it has been moved manually by lever 13. Thus when the accelerator pedal is in its uppermost range of movement the lock pin will be effective and it will so remain until the accelerator pedal is depressed below the dotted position as indicated by dotted lines 70 in Fig. 6, so that the roller 69 rides on the remainder of the cam lever and depresses the same to swing the cam lever and Bowden wire downwardly. The downward movement of the wire will of course retract the lock pin allowing spring 53 to move the switch actuating mechanism to neutral position to disconnect either light circuit.

The control mechanism will thus lock the switch operating mechanism in circuit forming position when the engine is decelerating or operating in its lowest power range and at all other times the switch mechanism is free to be actuated manually. Thus during operation of the vehicle the control mechanism can be operated by the accelerator pedal to lock or release the switch mechanism and thereby maintain or break a manually established circuit to either of the indicator bulbs. This control is in accordance with the accelerator pedal movement and lends itself to maintain and break the indicator circuit as required in direction changing operation of the vehicle. As a result, the indicator signal is automatically maintained over the necessary distance for vehicle direction changing and the driver's hands are free to operate the steering wheel or change speed gearing.

Upon resumption of normal speed pursuant to a depression of the accelerator control 22, the cam roller 69 will ride over the cam 68 of the cam lever 67, forcing the cam lever downwardly, drawing the Bowden wire and locking pin 56 toward retracted position as shown in Fig. 3. Because of the neutralizing spring 53, the switch mechanism will return to its neutral position and the signal will be cleared.

When proceeding at a normal rate of speed, manual indication may be given at any time and the control will immediately return to neutral position upon manual release thereof so long as the accelerator control is depressed beyond the predetermined range of movement near its retracted position.

It will be obvious to those skilled in the art that various modifications in construction and design may be made without departing from the spirit or scope of the invention, which is to be limited only by the appended claims.

What is claimed and desired to be secured by Letters Patent is:

1. In a signal system for vehicles having an engine with a fuel control pedal, a switch having a contact member movable into a plurality of circuit closing positions, means normally holding said switch contact member in open position, a manually operable selector mechanism for moving said switch member to a selected circuit closing position, and mechanical means directly connecting said pedal and said selector mechanism to retain said switch contact member in circuit closing position when said pedal is in a low fuel range position.

2. In a signal system for motor vehicles having an engine with a movable control, a switch having a contact member movable from a neutral position to a plurality of circuit closing positions, means normally urging said switch toward open position, manually operable selector mechanism for moving said switch contact member to a selected circuit closing position, and means connecting said engine control and said manually operable selector mechanism and arranged to be directly responsive to the movement of said engine control for retaining said manually operable selector mechanism in any one of the switch closing positions during a predetermined range of movement of said engine control.

3. In a signal system for a motor vehicle having an engine with a fuel control means, switch means having a contact member movable into a plurality of circuit closing positions, means yieldably urging said switch contact member toward open circuit position, a manually operable mechanism connected to move said switch contact member to a selected circuit closing position, and control mechanism connecting said selector mechanism and said fuel control means and operative to retain said switch contact member in a selected circuit forming position while said fuel control means is within a predetermined low fuel range of adjustment.

4. In a signal system for motor vehicles having throttle control mechanism, a switch having a swingable contact member movable into and out of a plurality of circuit forming positions, manually operable means connected to move said contact member into the circuit forming positions, spring means acting upon said manually operable means to move said contact member out of the circuit forming positions, a spring actuated bolt for locking said manually operable means in any circuit forming position, and means operable by the throttle control mechanism for releasing said bolt from locking relation with said manually operable means.

5. In a signal system for motor vehicles having throttle control mechanism, a switch having a pivoted contact member, an arm connected to swing said pivoted contact member into and out of circuit forming position, manually operable means for actuating said arm, spring means acting to urge said manually operable means into position where the arm will move the contact member out of circuit forming position, a spring actuated bolt normally acting to retain said manually operable means in circuit forming position, and means operable by the throttle control mechanism for releasing said bolt from retaining relation with the manually operable means.

6. In a signal system for motor vehicles having a pivoted throttle control lever operable by a pedal, a pivoted switch contact member, manually operable means for actuating said member, spring means urging said manually operable means into a position where the contact member will be in circuit breaking relation, a spring pressed bolt operating to retain said manually operable means in position where the contact member will be in circuit closing position, a pivoted cam member on which the throttle lever rides, and means connecting the bolt with the free end of the cam member, said lever acting against said cam member in one portion of its travel to cause the connecting means to release the bolt from retaining relation with the manually operable means.

7. In a signal system for motor vehicles, a pivoted switch contact member, manually operable means for actuating said member, spring means urging said manually operable means into position where the contact member is in open position, a spring pressed bolt operating to retain said manually operable means in circuit forming position, a pivoted cam member, tie means connecting the free end of the cam member with the bolt, and a lever riding on said cam means and operable by the vehicle driver's foot to cause movement of the cam member and tie means for releasing the bolt from retaining position.

8. In a signal system, for a motor vehicle having throttle control mechanism, a switch having a movable contact member; manually operable means for shifting said contact member into circuit forming position; a spring urging said manually operable means to open circuit position; and control mechanism for said manually operable means comprising a lock pin, a spring urging said pin into position retaining said manually operable means in circuit forming position, a pivoted cam member, means connecting said cam member with said pin, and a pivoted member riding on said cam member, said pivoted member being swingable with said throttle control mechanism to actuate said cam plate and pin connecting means and thereby retract said lock pin allowing said switch member spring to return said manually operable means to open circuit position, said cam member being formed to cause retraction of the pin only when the throttle mechanism is moved beyond a predetermined throttle opening position.

FRANK C. BEST.